United States Patent [19]

Carducci

[11] Patent Number: 5,540,402
[45] Date of Patent: Jul. 30, 1996

[54] CARGO CONVERSION SYSTEM FOR PASSENGER AIRCRAFT

[76] Inventor: Robert F. Carducci, 8 Prince Andrew Drive, Caledon East, Ontario, Canada

[21] Appl. No.: 382,114

[22] Filed: Feb. 1, 1995

Related U.S. Application Data

[63] Continuation-in-part of Ser. No. 104,640, Aug. 11, 1993, Pat. No. 5,421,539.

[51] Int. Cl.$^6$ ............................................. B64C 1/22
[52] U.S. Cl. ................................ 244/118.1; 244/118.2
[58] Field of Search ............................. 244/118.1, 118.2, 244/118.5, 121, 137.1; 410/117, 118, 130

[56] References Cited

U.S. PATENT DOCUMENTS

| | | | |
|---|---|---|---|
| 3,294,034 | 12/1966 | Bockerheimer | 244/118.1 |
| 3,480,239 | 11/1969 | Jansen et al. | 244/118.1 X |
| 4,899,962 | 2/1990 | Mueller | 244/118.1 X |
| 5,090,639 | 2/1992 | Miller et al. | 244/118.1 |

FOREIGN PATENT DOCUMENTS

| | | | |
|---|---|---|---|
| 2238283 | 5/1991 | United Kingdom | 244/118.1 |

*Primary Examiner*—Christopher P. Ellis
*Attorney, Agent, or Firm*—Ridout & Maybee

[57] ABSTRACT

A system for converting all or part of a passenger cabin in a fuselage of an aircraft for the carriage of freight, the cabin having internally finished longitudinal walls and ceiling defining an internal cross-sectional profile of substantially uniform cross-section. The system includes a dismountable rigid liner structure forming an enclosure having an external profile receivable within the internal profile of the cabin without contacting the walls and ceiling. It is formed of interlocking components individually small enough to pass through a cargo door in the fuselage and is supported between ends of the cabin solely by releasable anchorages engaging seat tracks installed in the cabin, the liner structure including transverse cargo restraints releasably secured thereto for restraining movement of cargo through said liner structure. The modules form a series of longitudinally connected compartments, each compartment including a truss element and anchors for securing a cargo restraint at its front end, an endmost compartment being closed at an end of the structure by a cabin bulkhead or a substitute bulkhead structure connected to the fuselage of the aircraft in place of a removable cabin bulkhead. The components of the enclosure may be sealed to each other and to the aircraft structure so as to isolate its interior from the cabin in which it is installed and resist the passage of smoke, fumes or flame from the enclosure to the cabin.

13 Claims, 10 Drawing Sheets

CARGO CONVERSION SYSTEM FOR PASSENGER AIRCRAFT

REFERENCE TO RELATED APPLICATION

This application is a continuation-in-part of my copending application Ser. No. 08/104,640, filed Aug. 11, 1993, now U.S. Pat. No. 5,421,539.

BACKGROUND OF THE INVENTION

1. Field of the Invention

This invention relates to systems for the rapid conversion of aircraft from passenger carriage to freight carriage and vice-versa.

2. Review of the Art

The high capital cost of passenger aircraft means that economic operation requires high utilization, and the ability to convert an aircraft between passenger and freight carriage can assist in improving utilization. So-called commuter aircraft present a particular problem in this regard, since the type of short range passenger traffic to which they cater is substantially a daytime traffic, leaving the aircraft unused at night. Nighttime traffic is frequently available in the form of courier and parcel traffic, but only if the aircraft can be converted between passenger and freight carriage sufficiently rapidly to enable both traffics to be carried within a single day. An alternative solution is to increase the size of the freight compartment within the aircraft at the expense of the passenger compartment, which represents a compromise and fails to exploit the capacity of the aircraft effectively for either passengers or freight, unless the relative proportions of passenger and freight space can be rapidly varied to suit demand.

When large aircraft are converted for freight carriage, provision is made for the freight to be loaded on pallets or in containers which are anchored to the aircraft structure; an exemplary arrangement is that shown in U.S. Pat. No. 3,480,239 (Jensen et al). If maximum freight storage is to be provided, it may be desirable to remove overhead baggage storage lockers, and U.S. Pat. No. 5,108,048 (Chang) discloses a system for facilitating the removal and reinstallation of such lockers.

In small aircraft, courier or parcel traffic will commonly be manually loaded rather than being palletised or containerised, and indeed such aircraft commonly have cargo doors which are neither of sufficient dimensions nor conveniently located to accept pallets or containers of any substantial size. Loose loaded packages, or packages in small bags or containers, on the other hand, both require the available cargo space to be divided by adequately anchored restraining nets, for example as shown in U.S. Pat. No. 2,669,402 (Del Mar), and also require that any internal finish of the aircraft passenger cabin that remains installed be adequately protected from damage by the cargo. It is difficult, if not impossible, to provide suitable anchorages for cargo nets to the fuselage of the aircraft through the cabin finish without impairing the appearance of the latter and giving it a makeshift appearance whilst the aircraft is functioning as a passenger carrier. Significant dismantling of the interior finish of the cabin is not practicable as part of a rapid and reversible conversion system.

U.S. Pat. No. 4,483,499 (Fronk) discloses a system for converting small passenger aircraft for the carriage of patients and cargo by the attachment of rack like structures to tracks in the aircraft normally utilized to secure its seats. Fronk is primarily concerned with providing means for converting an aircraft for air ambulance purposes, and overcoming the problem of loading stretchers through relatively small doors or hatches. Whilst his racks could be utilized for securing cargo, they are unsuitable for the storage of loose cargo of the kind presently contemplated, would provide little protection to the internal finish of the aircraft, and themselves occupy valuable cargo space.

Both the Fronk and Jensen patents make use of seat tracks provided longitudinally of the passenger cabin of the aircraft to secure their freight conversion equipment. These tracks are used to secure, releasably, passenger seating, in a manner which permits the seating of an aircraft to be rapidly removed or rearranged. Examples of such tracks, and fastenings for use with them, are shown in U.S. Pat. Nos. 5,131,606 (Nordstrom) and 5,169,091 (Beroth).

In certain applications it is desirable or a requirement to provide a sufficient degree of isolation between a cargo compartment of an aircraft and a passenger compartment in the same aircraft to inhibit the passage of fumes, smoke or flames from the cargo compartment to the passenger compartment in the event of fire or cargo leakage in the former. The prior art does not appear to provide for this possibility when passenger space is rapidly converted for freight carriage.

SUMMARY OF THE INVENTION

It is an object of the present invention to provide a system for rapidly converting all or part of a passenger cabin of an aircraft between carriage of passengers and carriage of loose freight, the interior finish of the cabin being protected during freight carriage, and anchorages being provided for freight restraints without any requirements for access to such anchorages through the cabin finish.

It is a further object of the invention to provide such a system which resists passage of flames, fumes or smoke from a portion of the cabin used for freight carriage into the remainder.

Accordingly, the invention provides a system for converting at least part of a passenger cabin in a fuselage of an aircraft for the carriage of freight, the cabin having internamely finished longitudinal walls and ceiling defining an internal cross-sectional profile of substantially uniform cross-section, said system comprising a dismountable rigid liner structure having an external profile receivable within said internal profile in non-contacting relation to said longitudinal walls and ceiling, and being formed of interlocking modules individually small enough to pass through a door in the fuselage providing access to the cabin, the parts of the liner structure including interengaging sealing members whereby to provide substantial resistance to the passage of smoke or flame from the inside to the outside of the liner structure.

Preferably the system is formed by sets of parts forming a series of longitudinally connected compartments, each compartment including a roof truss and means for restraining cargo at its front end, a compartment at one end of the system being connected to a bulkhead structure locked to the fuselage of the aircraft.

Further features of the invention will be apparent from the following description of preferred embodiments thereof with reference to the accompanying drawings.

SHORT DESCRIPTION OF THE DRAWINGS

DESCRIPTION OF THE PREFERRED EMBODIMENT

The embodiments of the invention to be described are particularly adapted to installation in the De Havilland Dash 8 (trademark) aircraft from Boeing Canada, but those skilled in the art will appreciate that the components of the system can readily be dimensioned for other commuter type aircraft.

Figure 1A:
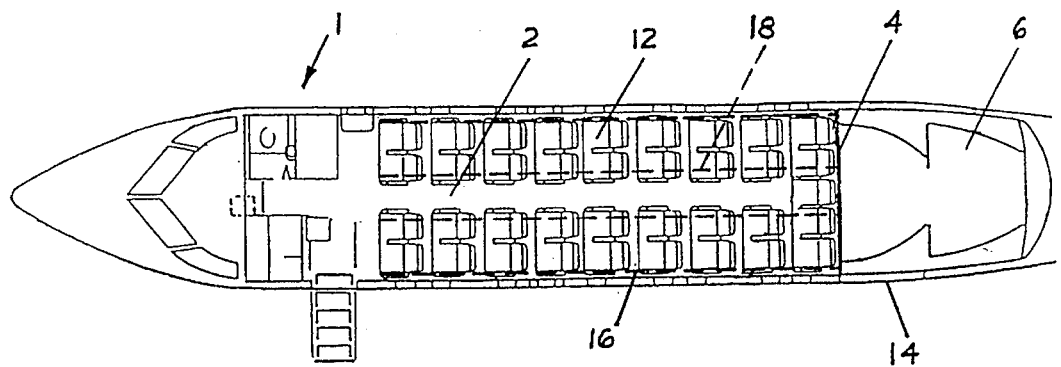
FIGS. 1A and 1B are horizontal and vertical longitudinal sections through the fuselage of a commuter passenger aircraft suitable for application of a conversion according to the invention.
Figure 1B:
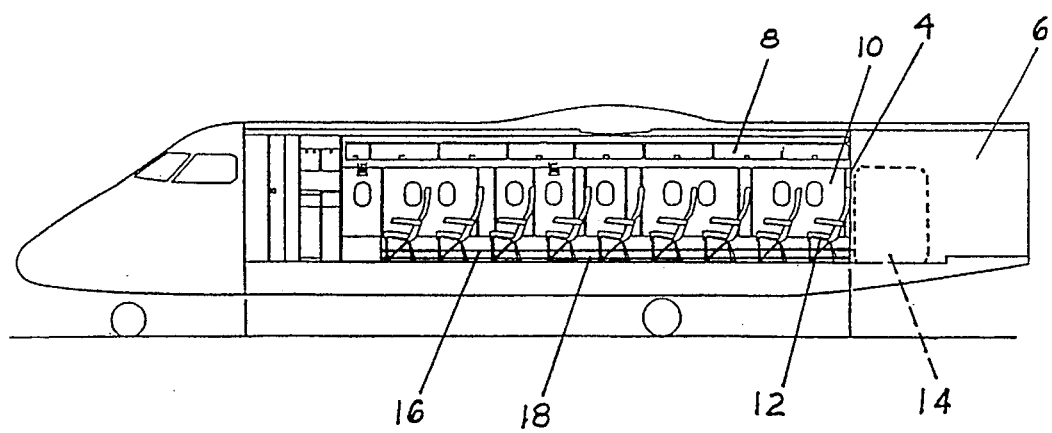

FIGS. 1A and 1B show a typical configuration of the fuselage 1 of such an aircraft, with a passenger cabin 2 of substantially uniform cross-section divided by a removable rear bulkhead 4 locked to the fuselage from a rear freight or baggage compartment 6. In fact the rear bulkhead may be located in alternative positions further forward to increase the size of the freight compartment, in which case the walls and ceiling of the fuselage will not necessarily be finished to the rear of the bulkhead. Whether or not the fuselage is finished to the rear of the bulkhead, the system of the invention may be used aft of the bulkhead to protect the finish if present and to provide a configuration allowing an increased cargo load by providing means for supporting additional cargo restraints. The present invention is concerned with utilising passenger cabin space, whether internally finished or not, in the fuselage ahead of a dedicated baggage compartment, for freight carriage, without the necessity for stripping or mutilating cabin finish that is present, for example locker assemblies 8 and wall panels 10. If the bulkhead 4 is relocated forwardly of the rear end of the cabin space, then the system may be used to convert space to the rear of the bulkhead. All that is necessary to prepare the aircraft for installation of the system of the invention, or to restore it for passenger operation after removal of the system, is to remove, relocate or reinstall the rear cabin bulkhead 4 and seating units 12, which may readily be removed or reloaded through a rear cargo door 14 when the bulkhead is removed. These routine procedures may be easily and rapidly carried out in accordance with instructions provided by the aircraft manufacturer. The seating units to either side of a central aisle are each secured in pairs of conventional outboard and inboard seat tracks 16 and 18 extending longitudinally along the cabin, which tracks are available for other purposes once the seating units are removed.

The system of the invention consists of a number of modules forming end to end compartments, and of such a size that they can readily be loaded through the cargo door of the aircraft. The compartments provide a rigid lining within the passenger compartment which protects and stands clear of the finish of its walls and ceiling.

Each compartment comprises three principal modules. Two of these are port and starboard panel assemblies 20, each formed by a wall panel 22 and a narrower roof panel 24 hingedly connected to brackets at the top edge of the panel 22 so that it may be moved from a folded position shown in broken lines in FIG. 4 to a deployed position shown in full lines in FIG. 4, as well as in FIG. 2. The assemblies 20 are held in deployed position by a roof truss 26 of dihedral form, formed with sockets through which pass pins 28 formed on the forward edges and aft edges of the panels 22 and 24 of the forwardmost compartment, in the case of the forwardmost truss, or pins 28 formed on the aft edges of the panels of the next forward compartment in the case of each following compartment. Fittings 32 on the bottom edges of the side panels 22 are locked into engagement with the outboard seat tracks 16. Each truss has two telescopically adjustable struts 30 hinged at their upper ends to its lower edge, and eyes at the lower ends of these struts are secured to the side panels 22 near the bottom of their front edges by engaging pins 28 at those locations and adjusted so as to brace the compartment concerned into a rigid structure locked to the seat tracks 16 and clear of the lockers 8 and wall panels 10.

The panels 22 and 24 are formed typically of aluminum with a peripheral frame 34, stiffeners 36 and a skin 38 presenting a smooth inner surface. The third from front stiffener supports a length of seat track 40 secured to it through the skin and shown fragmentarily in FIG. 4, for a purpose described later. Individual panels may be modified as necessary to accommodate features of the structure of a particular aircraft, for example as shown at 48 in FIG. 6.

Once the forwardmost compartment has been erected, the compartment behind it can be erected by first fitting its truss 26 and associated struts to the pins 28 at the aft edges of the panels of the forwardmost compartment, and then unfolding its panel assemblies 20 and locking the panels 22 to the tracks 16 with the pins 28 passing through the truss 26 and anchorages of the struts 30 into sockets in the forward edges of the panels. This procedure is repeated until all of the compartments, four in this example, have been erected. The foremost truss and its struts as well as all top panels are further secured to their adjacent panels by releasable tension straps 41. Other longitudinally adjacent panels in the system may likewise be connected by straps for additional security. Gaps between the roof panels, left to allow existing cabin lighting to illuminate the interior of the compartments, are bridged by connecting roof nets 42, preattached to one roof panel in each compartment, to the other roof panel and to adjacent roof trusses at each end. This avoids the possibility of loose freight being thrown upwardly through the gap in rough air conditions.

To protect the floor of the cabin and improve its local bearing capacity, floor panels 44 may be installed within the compartments. Conveniently, two panels cover the width of the floor, and are secured by anchors 46 engaging inboard seat tracks 18 through slots in the plates. For each compartment, these anchors are approximately longitudinally aligned with the tracks 40 on the panels 22.

In use, the compartments are loaded sequentially from the front. Before each compartment is loaded with cargo brought in through the cargo door 14, its front end is closed by a cargo restraining net 50. Typically these nets are formed in port and starboard portions connected by quick release connectors along a centre line, and outer ends of horizontal straps 52 are each connected to fastener bars 54 having fittings releasably with the tracks 40. These straps 52 are also held against front portions of the panels 22 by vertical rods 56 releasably locked at their lower ends by eye bolts engaging slots in the tubes to the forward edges of the panels 22, and at their upper ends by seat track fittings engaging seat track segments secured to the panels 22. Vertical straps 58 of the nets are secured at their top ends to the truss 26 of the compartment or to points on the roof panels 24 approximately longitudinally aligned with the tracks 40, and at their other ends to the anchors 46. The arrangement is such that under normal circumstances the net closes the front end of the compartment, but in the event of cargo being projected forward against the net, inward forces will be applied to the rods 56. When these forces rise above a predetermined minor proportion of the rated load of the net, the rods will bend and become detached from the panels 22, allowing the net to assume a sling shape. This in turn greatly reduces the lateral component of the loading applied to the panels 22 and enables panels of less strength than would otherwise be required to withstand without buckling the loading which could be applied by the nets in the absence of this feature.

Figure 3:
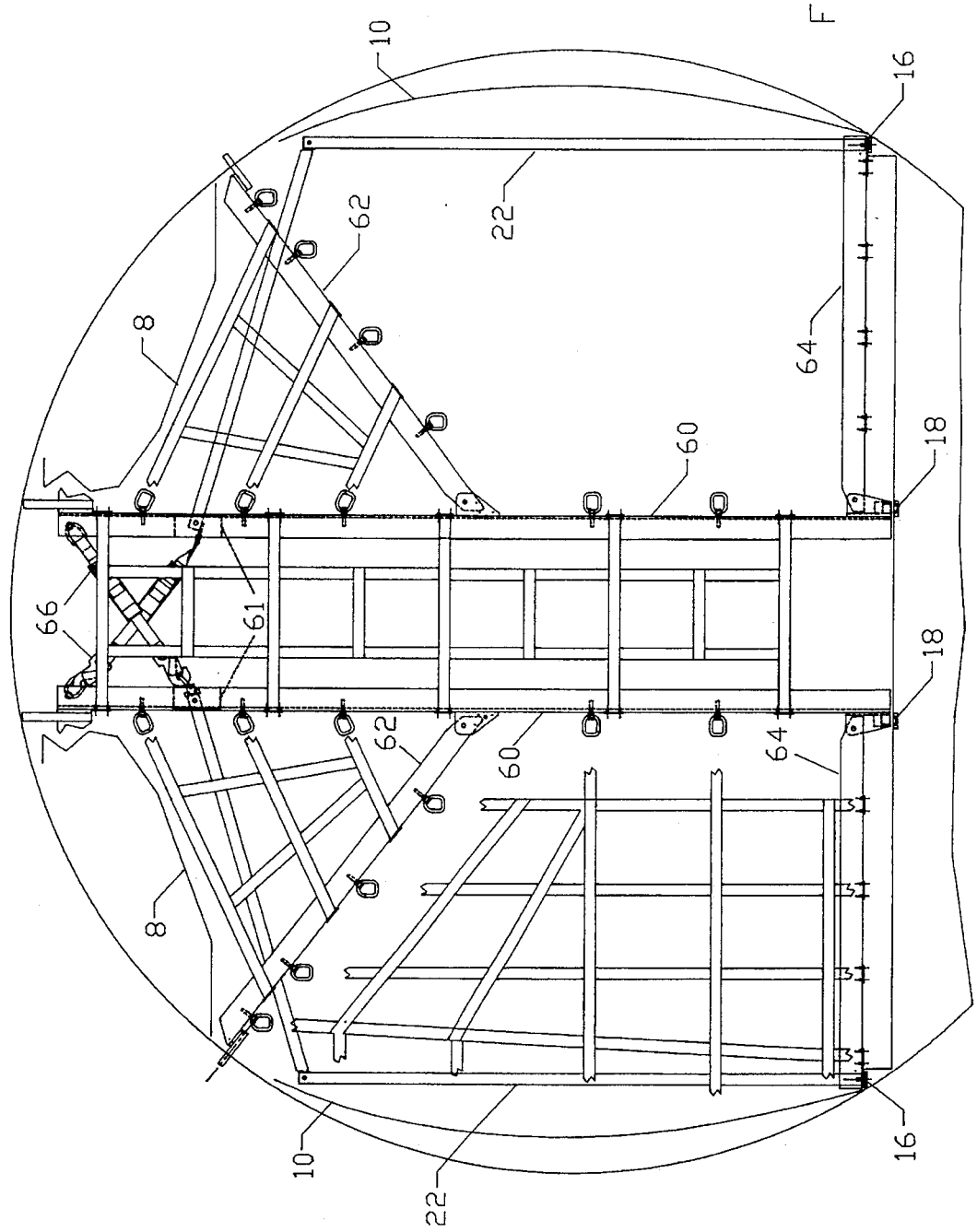
FIG. 3 is a rear elevation of the system, shown in relation to outlines of the aircraft fuselage and internal cabin finishing panels.

Once all of the compartments are loaded, frames and nets forming a cargo restraint to replace the bulkhead 4 are installed (see FIG. 3). Port and starboard frames each comprise a vertical member 60 which is installed so as to extend between an attachment point for the bulkhead and the track 18, and upper and lower hinged arms 62 and 64 which are locked to a further attachment point for the bulkhead and to the track 16 respectively. Cargo restraint nets are fastened between the vertical members 60, between the members 60 and the arms 62, and between the vertical members 60, the arms 62 and 64, and via breakaway anchorages to the aft edges of panels 22 or other conveniently located structure, to existing anchorages, not shown, in the cargo compartment rearward of the frames. The inner rear corners of the panels 24 of the rear compartment bear against angle brackets 61 on the vertical members 60, and are secured against the brackets by tightening diagonal straps 66 extending diagonally to the top of the opposite member 60.

All of the various straps and locking devices used in the assembly employ conventional quick release tensioning buckles, snap connectors and quick release locking pins. Tests with a prototype system have shown that a Dash 8-100 aircraft can be converted from passenger to freight carriage in little more than an hour, including removal of the bulkhead and seats, and converted back in much the same time, with only three people working in the aircraft. This timing makes night time freight haulage between daytime passenger carriage entirely practicable. The rigid structure erected within the fuselage can readily be made strong enough to meet cargo restraint requirements, particularly when used in conjunction with the two stage anchorages for the restraint nets described above.

Figure 4:
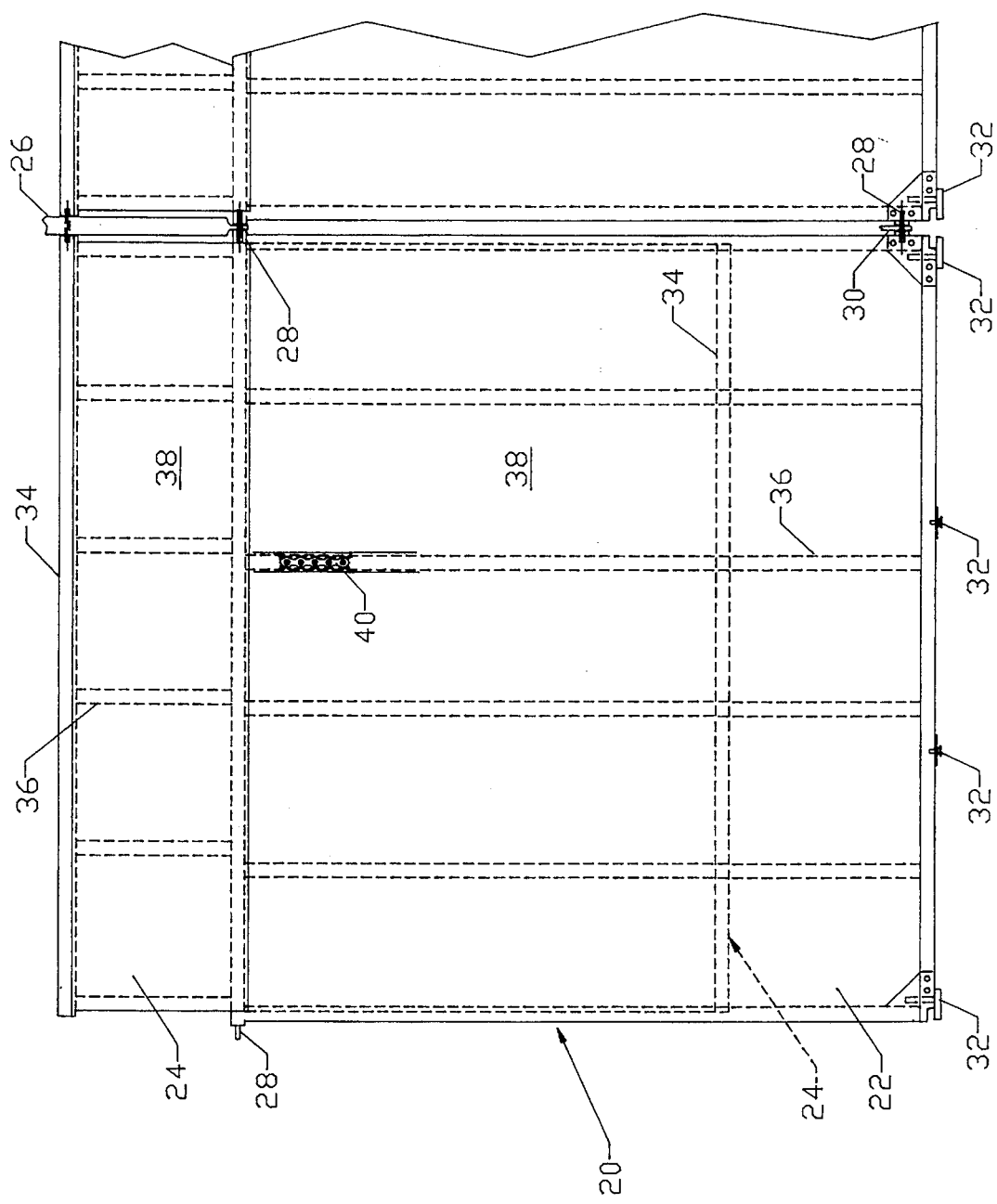
FIG. 4 is a side elevation of wall and roof panels used in the system.
Figure 5:
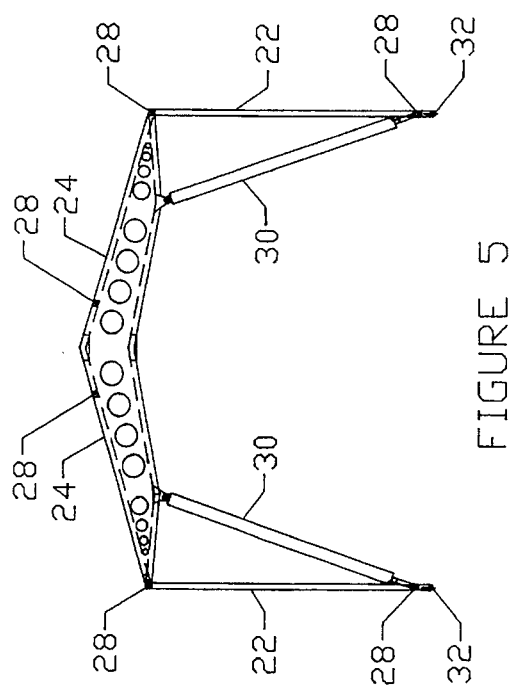
FIG. 5 is an end elevation of a roof truss showing its relation to side and roof panels.
Figure 6:
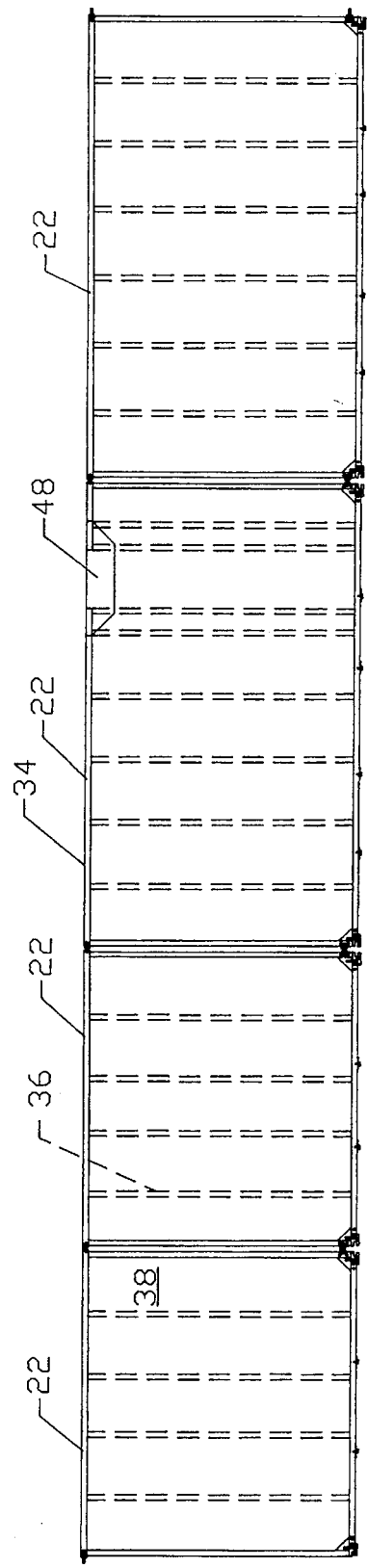
FIG. 6 is a side elevation of the side panels along one side of the cabin.
Figure 7:
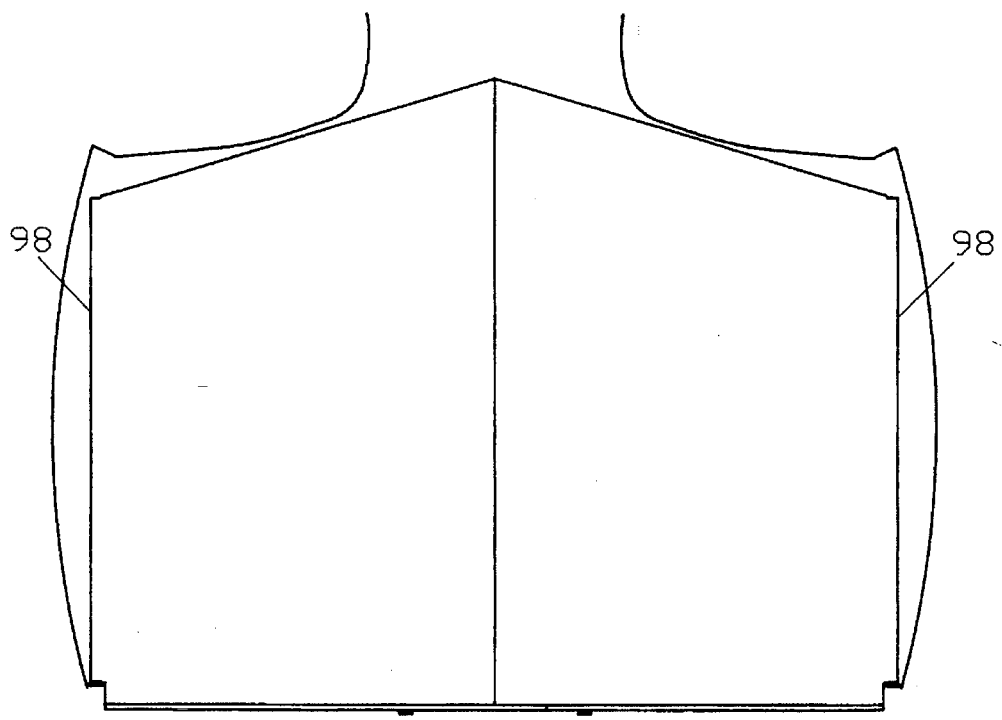
FIG. 7 is a front elevation of a second embodiment of the invention.

FIGS. 7–17 taken in conjunction with FIGS. 4–6, show how the presently described embodiment of the invention is modified to meet a requirement for providing sufficient isolation between a cargo compartment provided by the invention and the remainder of the passenger compartment to inhibit penetration of flames, smoke or fumes from the cargo to the passenger compartment in the event of fire or leakage of volatile material in the cargo compartment, or even merely the carriage of freight with a strong odour. The modification essentially consists of adding appropriate seals to mechanical seams in the liner structure, and replacing or supplementing netting components of the structure with sheets or webs of gas-impermeable and heat and flame resistant material. If the netting components are replaced, the components used must provide structural resistance comparable to that of the netting: otherwise they must accommodate normal displacement of the netting. The aluminum sheeting of the panels 22 and 24, and other aluminum sheeting used, may be covered, when extra heat or flame resistance is required, by a thin flameproof barrier layer, such as a glass, silica or quartz fibre fabric layer, or aluminum sheeting may be replaced by fire-resistant composite panels.

Figure 2:
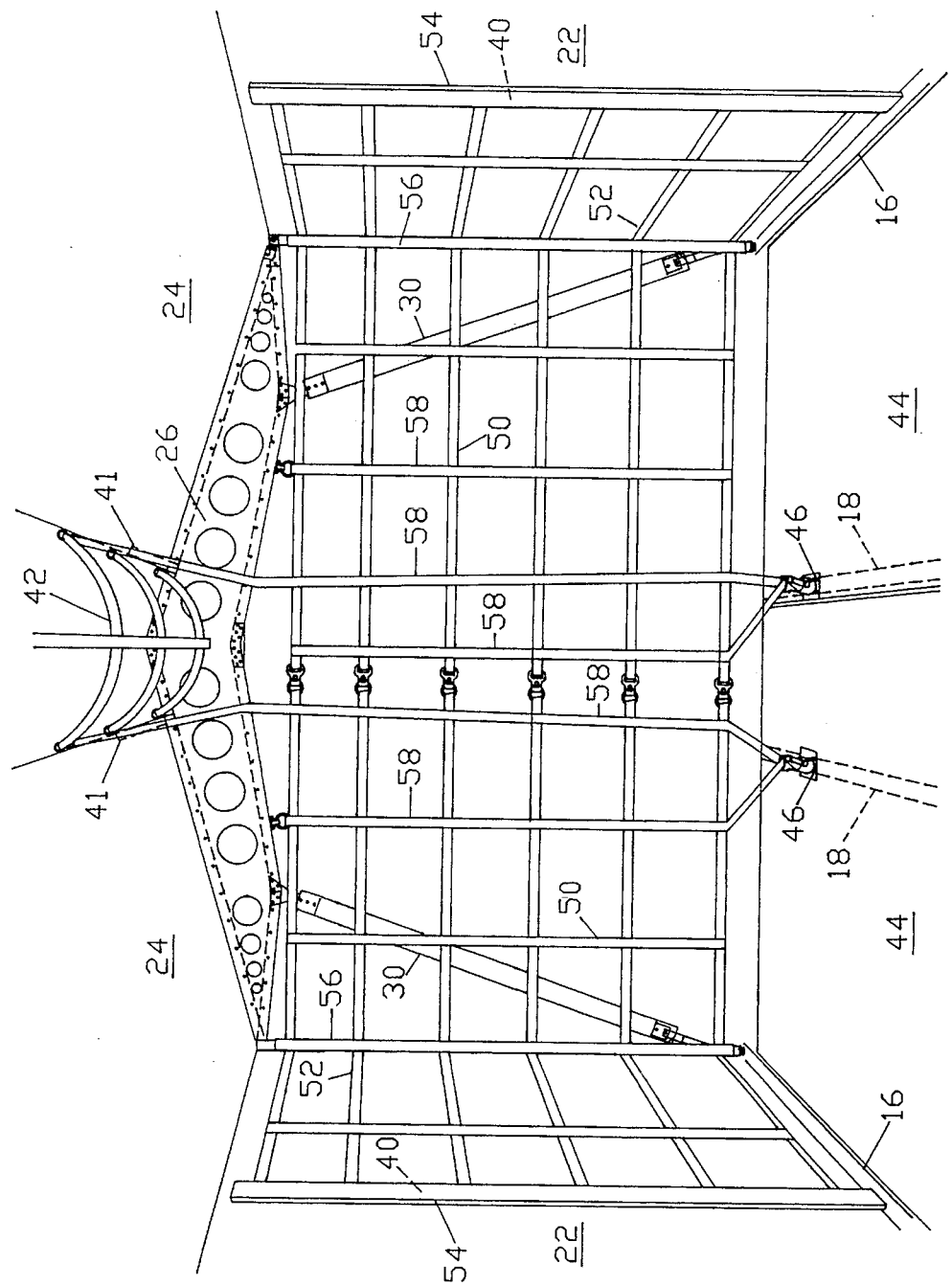
FIG. 2 is a perspective view looking forward through a front compartment of a system according to the invention.

Thus the netting and related components 50, 52, 54, 56, and 58 shown in FIG. 2 may be replaced or supplemented by panels 98 (see FIG. 7) releasably securing the front surfaces of the assemblies 20, the roof truss 26, the floor panels 44, and to each other by locking pins or other quick release fastenings (not shown). If the panels 98 replace the netting components, then they will typically be of reinforced aluminum sheet of similar structure to typical bulkhead panels, sufficient to provide the necessary structural strength, and the fastenings will be engineered accordingly. If the netting components are retained, the panels 98 should have sufficient flexibility or appropriate geometry to accommodate displacement of the netting under load, and may be of any suitable flexible flame and heat resistant material.

Figure 8:
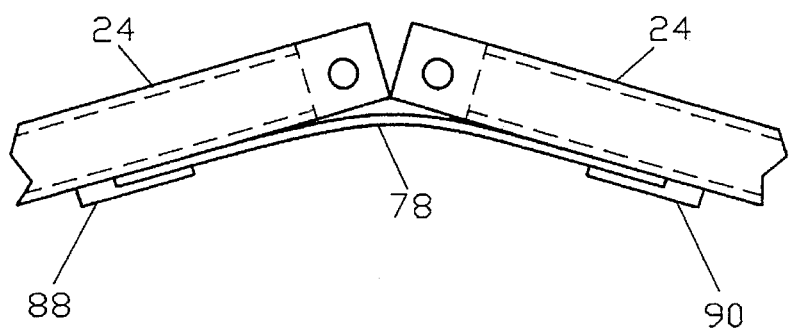
FIG. 8 is a detail illustrating a seal between two roof panels of the second embodiment.

The nets 42 as shown in FIG. 2 are similarly replaced or supplemented, for example as shown in FIG. 8, where the panels 24 are shown extended so as to meet at the apices of the trusses 26, and joined by a flexible seal member 78 permanently joined at 88 to one panel 24, and releasably attached at 90 to the other panel 24. If the material of the member 78 is at least partially translucent, and the panels 24 are configured so as to leave a gap between them, then existing cabin lighting can be employed to illuminate the interior of the cargo enclosure. The member 78 itself has sufficient strength to provide a cargo restraint function. In another variation the panels 24 are not extended, but are bridged by separately formed inverted trough-shaped panels 92 (see FIG. 9) secured in engagement with the inner edges of the panels 24. The panels 92 may be formed of suitable flame and heat resistant material so as to provide a clerestory through which cabin illumination may enter the cargo enclosure if the panels are at least partially translucent. Alternatively, lighting may be installed within the enclosure, for example in apertures in the trusses 26.

Figure 10:
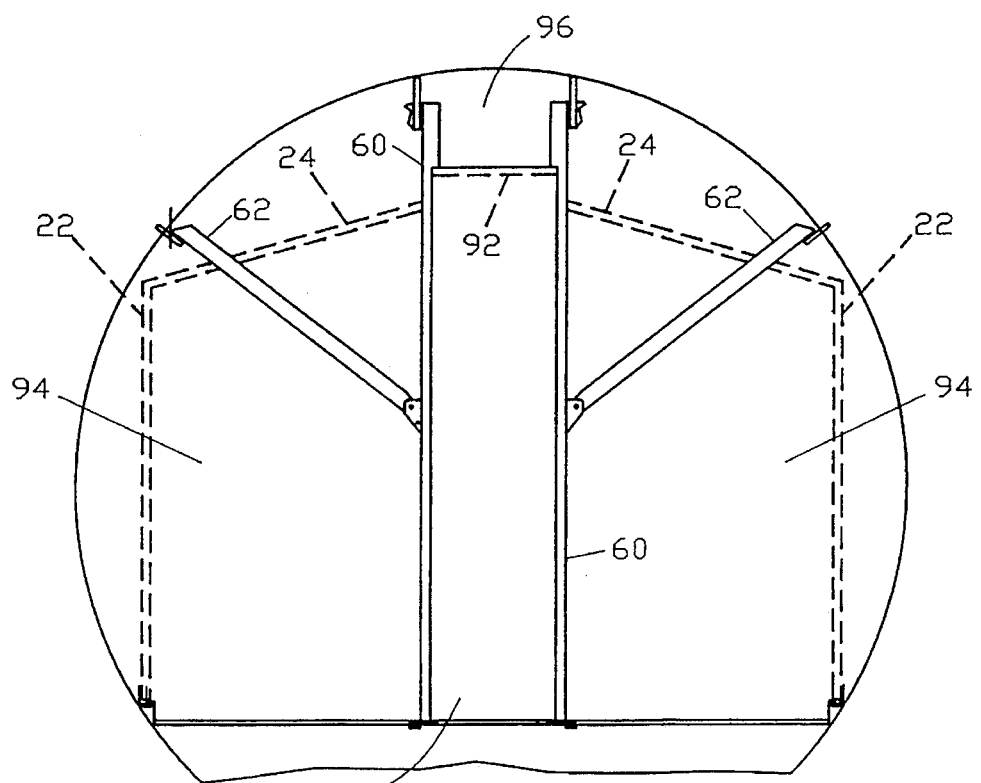
FIG. 10 is a rear elevation of a bulkhead structure which is used in place of a rear cabin bulkhead in the embodiment of FIG. 9.

At the rear of the cargo enclosure formed by the system of the invention it is necessary to insulate the enclosure from the surrounding portions of the aircraft passenger cabin in such a way as to inhibit passage of smoke or flames between the interior of the cargo enclosure and the interior of the remainder of the passenger compartment within which the enclosure is formed. This may be achieved in various ways. In one approach, seals are established between the cargo compartment formed by the system of the invention and the bulkhead 4 (see FIGS. 1A and 1B) so as to isolate the compartment formed by the system of the invention from the regular baggage compartment 6. Unless a cargo door is installed within the bulkhead, this entails that the cargo enclosure formed by the system of the invention is loaded from the front. In a preferred arrangement, the cargo restraint of FIG. 3 is modified so as to provide a replacement bulkhead structure 100 of a form providing access between the cargo enclosure and the baggage compartment, as best seen in FIG. 10. The frame members 60 and 62 are similar to those of FIG. 3, but the nets shown in FIG. 3 are replaced or supplemented by panels 94 and 95 positioned between or on the frame members and the panels 22, 24 and 92 of the rearmost portion of the cargo enclosure and extending to the aircraft fuselage, suitable seals being provided so as to establish a sealing relationship between the panels 94 and 95, on the one hand, and the panels 22, 24 and 92 and the fuselage on the other hand, thus isolating the enclosure from the remainder of the cabin space within which it is assembled. A further removable panel 95 may replace the nets between the frame members 60, to provide both a cargo restraint and an access door. The panels 94 and 95 may be non-structural, in which case they must be supplemented by nets as in FIG. 3, and must accommodate deflection of the nets. If there is no sealing of the cargo compartment behind the bulkhead, and the panels 94 and/or 95 is absent or not sealed, further panels or panel extensions 96 will be required extending to the fuselage to isolate the outer portion of the cabin from the enclosure and the baggage compartment.

Figure 11:
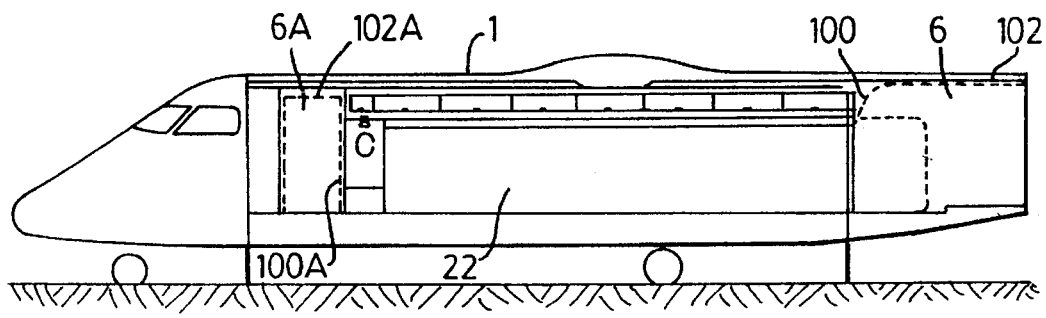
FIG. 11 is a schematic longitudinal part section of an installation in an aircraft of the second embodiment of the invention, and also illustrating an alternative location of the passage compartment formed in some aircraft.
Figure 12:
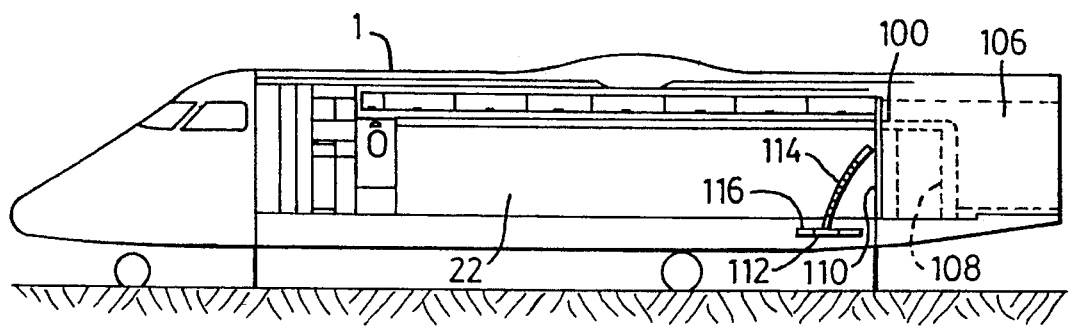
FIG. 12 is a diagram similar to that of FIG. 11, showing a slightly different installation.

As seen in FIG. 11, the existing baggage compartment 6 may be provided with a flame and smoke resistant liner 102, which is appropriately sealed to the rear of the bulkhead 100, or with a liner shell 106 as shown in FIG. 12, similarly sealed to the bulkhead and provided with an inner access door 108 for cargo loading and unloading. This liner shell may be fabricated in a number of ways, but in a preferred form is constructed of panels and trusses in a similar fashion to the cargo enclosure forward of the bulkhead with floor anchorages such as seat track segments added to the baggage compartment floor in suitable locations.

Also referring to FIG. 11, a baggage compartment 6A can in some aircraft be located forward of the passenger cabin, and divided from it by a bulkhead 100A, in which case the enclosure of the invention can extend rearwardly from the bulkhead, and the compartment may be provided with a lining 102A or shell.

FIG. 12 also shows how an existing cabin air dump system may be connected by a duct 114 to an opening in a panel 20 so as to extract air from the interior of the cargo enclosure, thus permitting the interior of the enclosure to be maintained at a marginally lower pressure than the remainder of the cabin so as further to reduce the risk of smoke, fumes or fire extinguishing materials such as foam from entering the remainder of the cabin space through imperfect seals. A separate air dump system may also be installed and connected to duct 114.

Various exemplary techniques for establishing seals between components of the cargo enclosure and between such components and the aircraft structure are illustrated in FIGS. 13–17.

Figure 13:
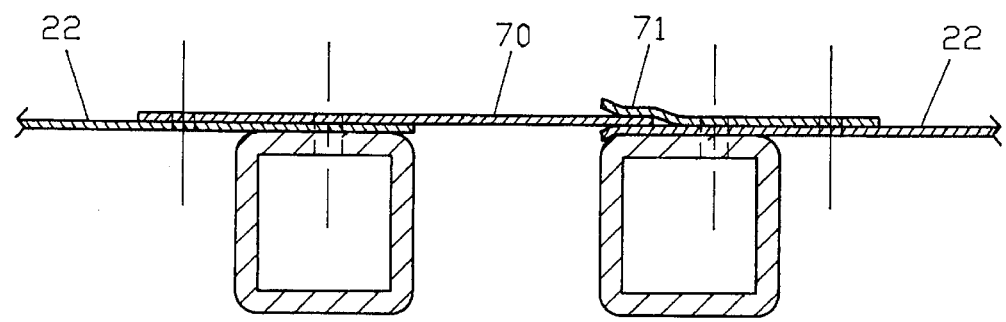
FIGS. 13–17 are fragmentary sections and views through and of various seal structures employed in the second embodiment.
Figure 14:
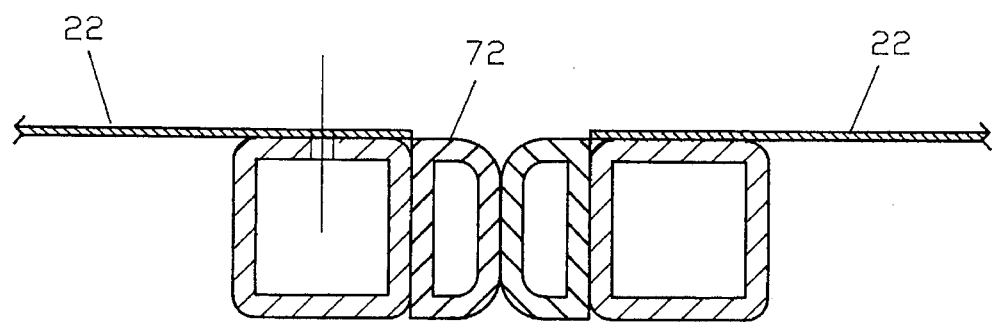

FIGS. 13 and 14 illustrate alternative techniques for establishing seals between adjacent panels 22. In FIG. 13, a seal flange 70 attached to one panel 22 enters a channel formed by a further shaped flange 71 attached to a second panel. In FIG. 14, flexible tubular interengaging seal members 72, which may be inflatable, are provided.

Figure 15:
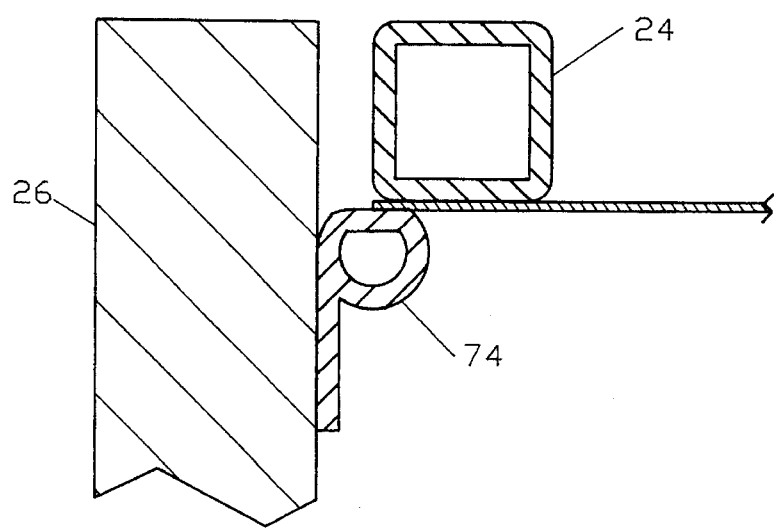

FIG. 15 shows a tubular seal member 74, which may be inflatable, attached to a truss 26 so as to make sealing contact with a panel 24.

Figure 16:
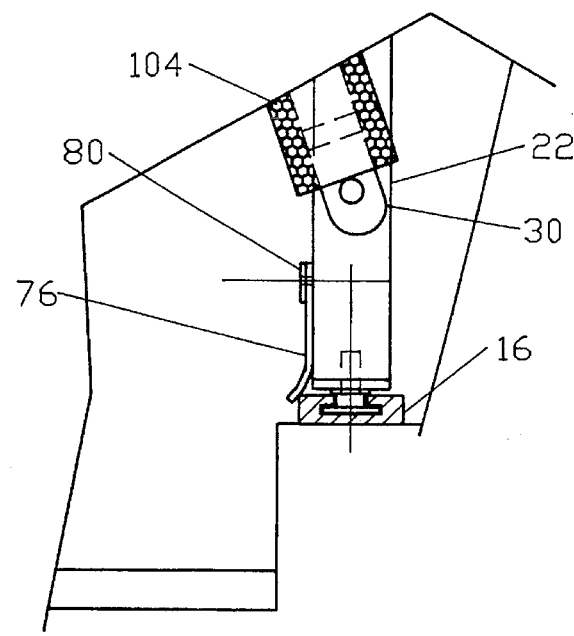

FIG. 16 shows a technique for establishing seals between a panel 22 and a seat track 16. A resilient flange 76 is attached to the panel and bears on the seat track. Alternatively, the flange 76 may be replaced by a seal similar to the seal 74 shown in FIG. 15. Also shown in FIG. 16 is a resilient deformable sleeve 104 placed around a lower end of a strut 30 so as to establish a seal around the strut where seals 72 as shown in FIG. 14 must be interrupted to accommodate the strut.

Figure 17:
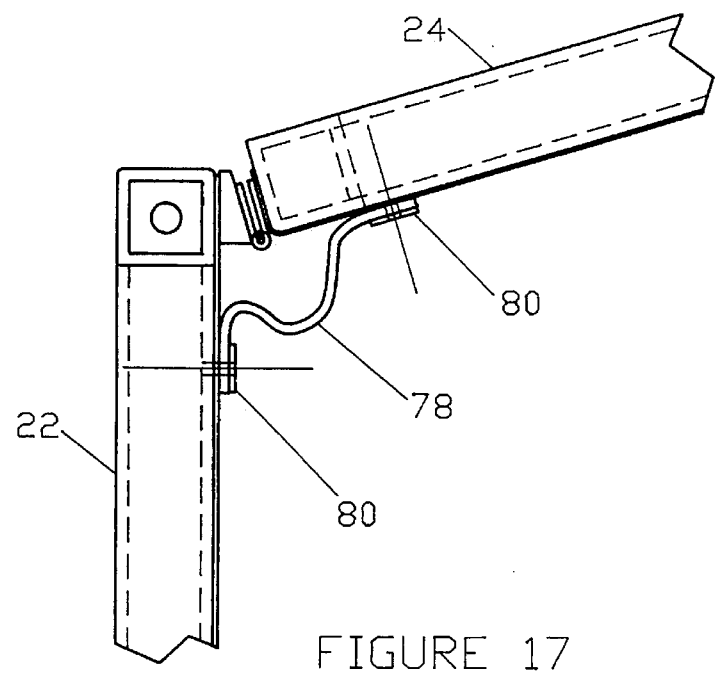

FIG. 17 shows a web 78 of flexible material connected by fasteners 80 to adjacent hinged panels 22 and 24 so as to form a seal between them.

Similar techniques are utilized to form various other seals required in the structure to render the enclosure sufficiently resistant to the escape of smoke or flame.

Figure 9:
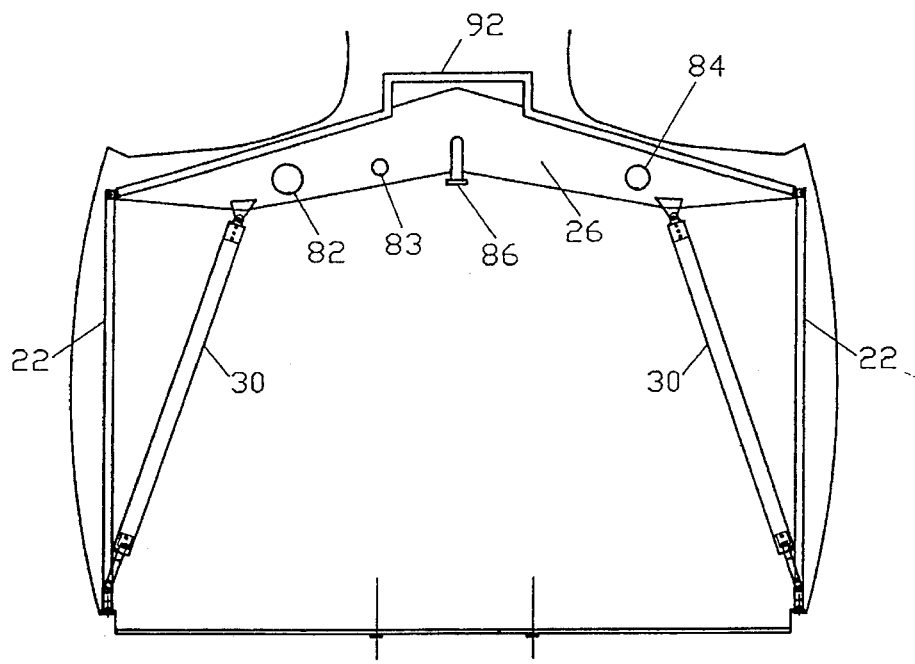
FIG. 9 is a transverse cross-section through a variation of the second embodiment, intermediate along its length.

Since the enclosure is essentially sealed, it will in most cases be required to include its own fire detection and extinguishing systems. Referring to FIG. 9, appropriate equipment such as fire, heat and smoke detectors 82, 83 and 84 may be provided on one or more of the trusses 26, which may also carry nozzles 86 for dispersing a fire extinguishing agent. It will be appreciated that the same sealing that protects the rest of the aircraft from smoke, flame and flame escape from the enclosure will also serve to inhibit escape of the fire extinguishing agent, and will restrict access of air needed to sustain any fire which may break out within the enclosure.

When additional flame and heat resistance is either required or advantageous, additional flame proof protection, such as textile materials formed of glass, silica, or quartz fibres, can be utilized as a barrier for the aforementioned seals. In this case, the barrier can be installed separately over the length of each seal and fixed with quick connect fasteners or other suitable fasteners or alternatively the barrier could form part of the non-removable seal system by remaining attached to the exposed surface of a seal. Seals which utilize a distinct but attached heat barrier could also be utilized.

The tubular structure of the panels 22 and 24 could be utilized to duct fire extinguishing medium to various compartments of the cargo compartment. In this case, flexible quick-connect hoses would be connected between panels upon installation of adjacent panels. Fittings would be installed in the tubes to accept the hose connections.

Whilst the system has been described in relation to a particular application to particular aircraft, variations within this application, or to suit other aircraft, may be made within the scope of the appended claims. For example, the nets shown and described could be replaced by other suitable cargo restraints, or located differently within the compartments.

I claim:

1. A system for converting at least part of a passenger cabin in a fuselage of an aircraft for the carriage of freight, the cabin having internally finished longitudinal walls and ceiling defining an internal cross-sectional profile of substantially uniform cross-section, said system comprising a dismountable rigid liner structure having an external profile receivable within said internal profile in non-contacting relation to said longitudinal walls and ceiling, said structure being formed of portable interlocking parts individually small enough to pass through a door in the fuselage providing access to the cabin, the parts including interengaging sealing members which impart to the liner structure a substantial resistance to the passage of smoke or flame from an enclosure within the liner structure to the cabin external to said liner structure.

2. A system according to claim 1, wherein said structure is supported between ends of the cabin solely by releasable anchorages engaging seat tracks installed thereon for supporting passenger seating in the cabin.

3. A system according to claim 1, wherein the liner structure includes a bulkhead structure at an end thereof secured to the fuselage of the aircraft at a corresponding end of the cabin.

4. A system according to claim 1, wherein the liner structure is formed by sets of parts forming multiple longitudinally adjoining compartments, each including wall and roof panels and a transverse roof truss.

5. A system for converting at least part of a passenger cabin in a fuselage of an aircraft for the carriage of freight, the cabin having internally finished longitudinal walls and ceiling defining an internal cross-sectional profile of substantially uniform cross-section, and seat tracks for supporting passenger seating in the cabin extending longitudinally from a cabin bulkhead location, said system comprising a dismountable enclosure mounted on said seat tracks and extending into said cabin from a bulkhead structure connecting to said fuselage at said cabin bulkhead location, said enclosure being closed at an opposite end and having a cross-sectional profile of substantially uniform cross-section received wholly within and spaced from said cross-sectional profile of the cabin.

6. A system according to claim 5, wherein the components of said dismountable disclosure are sealed to each other, to said track, and at said bulkhead structure from the cabin to render said enclosure resistant to the passage of smoke or flame from said enclosure into the cabin.

7. A system according to claim 6, further including a duct into said enclosure from an air dump system of the aircraft.

8. A system according to claim 6, wherein panels at a front end of the enclosure and in the bulkhead structure are structural elements capable of acting as cargo restraints.

9. A system according to claim 6, wherein a baggage compartment located in said fuselage on an opposite side of the cabin bulkhead location from the enclosure is in communication with the enclosure through said bulkhead structure.

10. A system according to claim 9, including a flame and smoke resistant liner for said baggage compartment, sealed to said bulkhead structure.

11. A system according to claim 1, wherein said liner structure supports fire and smoke detection devices within the structure.

12. A system according to claim 11, wherein said liner structure further supports fire extinguishing means within the structure.

13. A system according to claim 6, wherein said bulkhead structure divides the cabin from a baggage compartment, and including a flame and smoke resistant liner for the baggage compartment sealed to the dismountable enclosure at the bulkhead structure.

* * * * *